(12) United States Patent
Peetz

(10) Patent No.: US 6,742,610 B2
(45) Date of Patent: Jun. 1, 2004

(54) ROCK DRILL

(75) Inventor: Wolfgang Peetz, Fronreute-Blitzenreute (DE)

(73) Assignee: Hawera Probst GmbH, Ravensburg (DE)

( * ) Notice: Subject to any disclaimer, the term of this patent is extended or adjusted under 35 U.S.C. 154(b) by 0 days.

(21) Appl. No.: 10/220,435

(22) PCT Filed: Feb. 24, 2001

(86) PCT No.: PCT/DE01/00720

§ 371 (c)(1),
(2), (4) Date: Sep. 3, 2002

(87) PCT Pub. No.: WO01/66899

PCT Pub. Date: Sep. 13, 2001

(65) Prior Publication Data

US 2003/0019667 A1 Jan. 30, 2003

(30) Foreign Application Priority Data

Mar. 9, 2000 (DE) .......................... 100 11 108

(51) Int. Cl.⁷ .......................... E21B 10/44; E21B 10/36
(52) U.S. Cl. .................... 175/420.1; 175/323; 175/394; 175/427
(58) Field of Search ................ 175/323, 394, 175/420.1, 427, 415

(56) References Cited

U.S. PATENT DOCUMENTS

| 2,635,856 | A | | 4/1953 | Scheffer | |
| 4,143,723 | A | * | 3/1979 | Schmotzer | 175/420.1 |
| 4,579,180 | A | * | 4/1986 | Peetz et al. | 175/394 |
| 4,967,855 | A | * | 11/1990 | Moser | 175/394 |
| 5,096,344 | A | * | 3/1992 | Fischer | 408/230 |
| 5,779,403 | A | * | 7/1998 | Kleine et al. | 408/230 |
| 5,918,105 | A | | 6/1999 | Anjanappa et al. | |
| 6,089,337 | A | * | 7/2000 | Kleine et al. | 175/394 |
| 6,345,940 | B2 | * | 2/2002 | Anjanappa et al. | 408/230 |

FOREIGN PATENT DOCUMENTS

| DE | 23 58 447 B | 3/1975 |
| DE | 36 09 911 A1 | 10/1986 |
| DE | 197 34 094 A1 | 5/1998 |
| DE | 197 07 115 A1 | 8/1998 |
| DE | 197 53 731 A1 | 6/1999 |
| EP | 0 322 554 A1 | 7/1989 |
| EP | 0 790 092 A1 | 8/1997 |

* cited by examiner

*Primary Examiner*—Hoang Dang
(74) *Attorney, Agent, or Firm*—Venable LLP; Robert Kinberg

(57) ABSTRACT

A rock drill (1) for rotary hammers or the like is proposed in which a conveying helix (3) having main and secondary webs (6 to 9) is used. In this case, the convexing helix (3) is run up to the front region of the drill head (2) with the core cross section being increased or the flute depth being decreased.

11 Claims, 2 Drawing Sheets

ROCK DRILL

The invention relates to a rock drill for hand-guided rotary hammers, percussion drilling machines or rotary drilling machines.

PRIOR ART

A known rock drill consists of a helical shank and a drill head in which a carbide cutting element, roof-shaped in side view and extending over the entire drill nominal diameter, is inserted (DE 197 34 094 A1). For this purpose, the drill head has an axially running, slot-shaped recess, into which the carbide cutting tip is inserted and brazed in place.

In order to achieve adequate endurance of the drilling tool, the carbide cutting tip must have a certain minimum thickness, a factor which necessitates a correspondingly wide locating slot for the carbide cutting tip. However, such a locating slot extending over the entire diameter for the carbide cutting tip reduces the wall thickness available at the drill head for supporting the carbide cutting tip.

Powerful rock drills require conveying helices having a high volume of the conveying helix flutes in order to permit the removal of as high a quantity of drillings as possible. A high flute volume is achieved by a large flute depth, which, however, leads automatically to a smaller core thickness of the remaining core cross section of the conveying helix.

If such a flute cross section were to be run with uniform flute depth right into the top region of the drill head, there would be no material at the drill head, on account of the uniform conveying helix web, in order to embed a carbide cutting tip if possible on both sides and completely in the drill head. For this reason, the conveying helix, for example according to the representation in FIGS. 4, 5 and 7 of said DE 197 34 094 A1, is not run right into the front region of the drilling tool or drill head but rather ends at a certain distance below the drill head and in particular below the slot root for locating the carbide cutting tip. In a representation according to the prior art, this is-shown schematically in FIGS. 2a, 2b of the present invention. When the drilling tool is being produced, the helix angle α, measured toward the drill longitudinal axis, of the conveying helix in the region of the drill head is therefore run toward zero; that is to say that the profile grinding wheel used to produce the conveying helix flute and set at an angle is backed out virtually parallel to the axis of the drill head in the end region of the conveying helix without the drilling tool still rotating in this region. The conveying helix is therefore not continued up to the front end of the helical shank but is designed as a type of flat, chisel-shaped point. Owing to the fact that the conveying helix is not continued up to the front region of the drill head, the land of the conveying helix widens in this region, so that material for locating and embedding the carbide cutting tip is obtained. This is shown for the prior art in FIGS. 2a, 2b in each case in side view.

Such production therefore leads to a flat, chisel-shaped drill head in which a corresponding longitudinal slot for locating the carbide cutting tip can be made. In this case, the transition between carbide cutting tip and conveying helix can be ground, as shown with the surface sections 25, 26 in the above-mentioned FIGS. 4, 5, 7 of DE 197 34 094.

On account of this configuration of the drill head or of the transition between the conveying helix and the drill head, a type of chisel-shaped, that is to say flat, drill head geometry is produced, which has a high removing capacity. A disadvantage, however, is that the guidance properties of the drilling tool in this region are effected solely by the carbide cutting tip, since the region of the annular support of the conveying helix or of the helical shank is not present in this front flat region of the drill head, but only comes into effect when the fully formed conveying helix engages in the drill hole.

OBJECT AND ADVANTAGES OF THE INVENTION

The object of the invention is to provide a drilling tool which does not have the above-mentioned disadvantages and in which, in particular just after the start of drilling, effective guidance of the drilling tool in the drill hole is also obtained in the drill head region. A further advantage is especially robust embedding of the carbide cutting tip.

This and other objects are achieved by a rock drill for hand-guided rotary hammers, percussion drilling machines or rotary drilling machines. The rock drill has a drill head having at least one locating slot, a carbide insert, and a supporting region of the carbide insert. The rock drill also has a single- or multi-start conveying helix having a flute and adjoining the drill head, and a clamping shank adjoining the conveying helix. The carbide insert extends at least in a direction transversely across the drill head and is embedded in the at least one locating slot. The drill head has a support for the carbide insert in a region of the embedding of the carbide insert. The conveying helix extends into the supporting region of the carbide insert, and a core thickness of the conveying helix flute increases toward the drill head.

The central idea of the invention is to continue the conveying helix as far as possible up to the drill point in order to thereby achieve optimum conveying and guidance properties of the drilling tool even in the drill head region. In this case, however, it must be ensured that adequate support, as far as possible over the full surface area, of a carbide insert embedded in the drill head is ensured, this carbide insert preferably being designed as a carbide cutting tip. These factors, which are actually inconsistent with one another, are harmonized by the land width of the conveying helix of the drill head being widened continuously or discontinuously, which—with a preferably uniform helix angle of the conveying helix—is effected by a continuous increase in the core cross section or a corresponding decrease in the flute depth. This is done during the production of the drilling tool, e.g. by continuously backing the grinding or milling tool out of the conveying helix flute. In this way, the conveying helix web is widened toward the drill head, as a result of which the effective cross section for making a locating slot for the carbide cutting tip is increased.

Consequently, if the conveying helix in the prior art ends in the region of the slot depth for locating the carbide cutting tip, the conveying helix in the present invention is run well into the head region, that is to say beyond the level of the slot root. Nonetheless, the desired widening of the land surface occurs, so that an effective slot can still be made for the carbide cutting tip.

The conveying helix is consequently run right into the region of the surface sections for the lateral support of the carbide cutting tip. In this case, preferably no change in pitch relative to the helix angle of the conveying helix is carried out; that is to say that the helix angle is not brought to the value zero as in the prior art. The increase in the core strength of the conveying flute in the region of the drill head may be effected continuously or discontinuously. Normally this is carried out continuously by backing out the tool uniformly.

The increase in the core thickness of the conveying helix for forming adequate support for the carbide cutting tip is preferably effected in such a way that the carbide cutting tip is embedded on both sides, that is to say supported on both sides. Of course, the support is especially important in the region lying behind the flank of the cutting tip.

According to the invention, it is therefore necessary to have the conveying helix flute start directly in the region which is designed as a surface section for supporting the carbide cutting tip.

In a development of the invention, provision is made for the conveying helix to be of single- or multi-start design, encircling main webs and encircling secondary webs being formed which are preferably designed according to the earlier application of the applicant DE 197 53 731. Reference is expressly made thereto. In this prior art, the access to each secondary conveying flute and to the main conveying flutes is achieved by an extremely thin drill head, which is achieved by a straight, axially parallel runout of the conveying helix in the region of the drill head. The teaching according to the invention can also be advantageously realized in such a special conveying helix having the advantageous properties associated therewith. Further designs in this respect are specified in the subclaims. In this case, for example, the conveying edges of the main and/or secondary webs, to form bearing surfaces for drillings, preferably run approximately at right angles to the drill longitudinal axis. The secondary web of the secondary conveying helix may be designed with a land tapering to a point. However, other cross-sectional shapes may also be used for the secondary conveying helix, as specified in detail in DE 197 53 731.

Further details and advantages of the invention follow from the description of the exemplary embodiment below.

In the drawing:

FIG. 1b shows a side view of the representation according to FIG. 1a,

FIG. 1c shows a plan view of the tool according to FIG. 1b or FIG. 1a,

DESCRIPTION OF THE EXEMPLARY EMBODIMENT

Figure 1A:
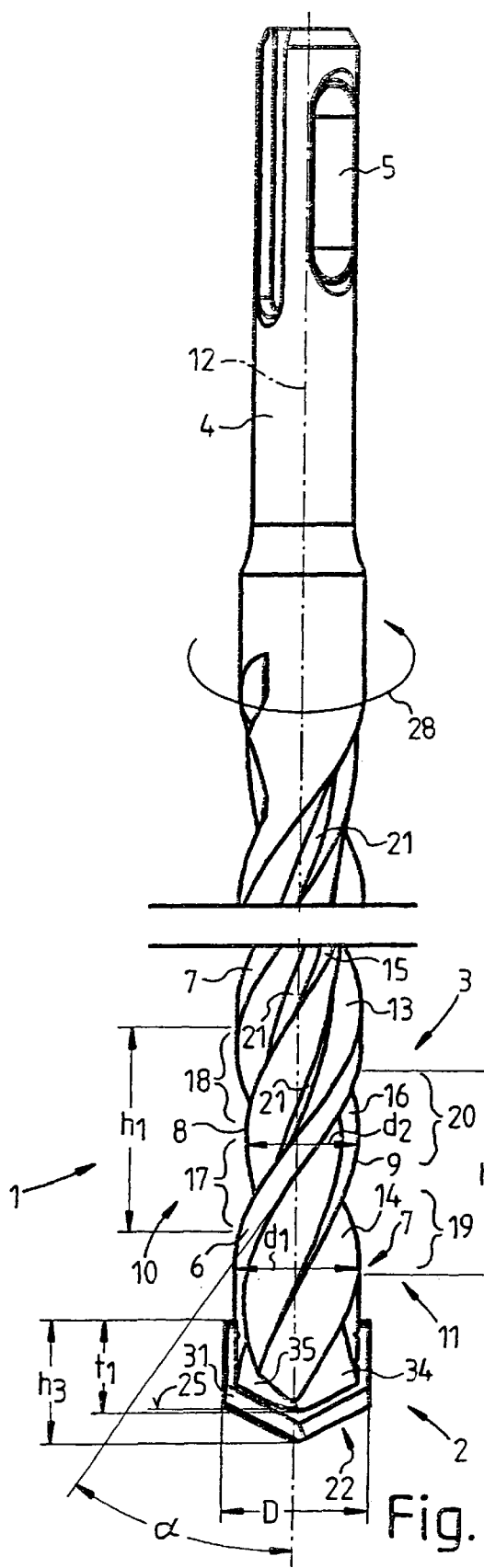
FIG. 1a shows a side view of a drilling tool according to the invention.
Figure 1B:
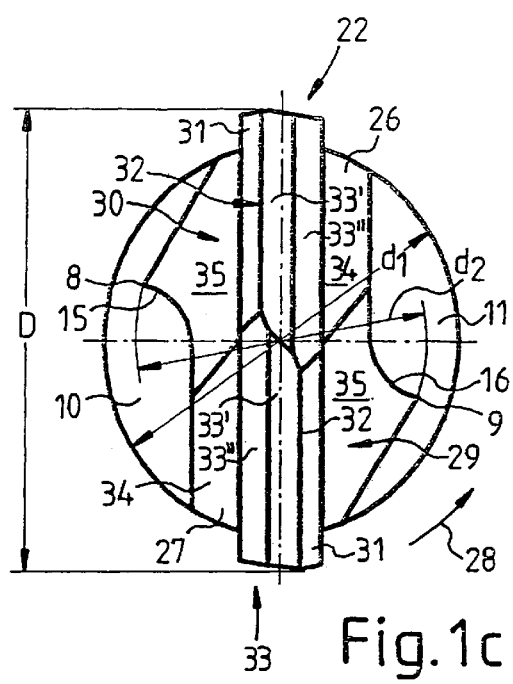

The rock drill 1 shown in FIGS. 1a, 1b in each case in side view consists of a drill head 2, a helical shank adjoining this drill head and having a two-start conveying helix 3, and a clamping section 4 adjoining this helical shank and intended for inserting into a drive machine. The clamping shank 4 has locating means 5 for inserting into a rotary hammer (SDS-plus shank).

In its construction, the helical shank or conveying helix 3 is in principle designed in the same way as described in principle in the publication DE 197 53 731 A1 of the applicant and in particular in FIGS. 1 and 2 there. Reference is hereby expressly made thereto. In this case, in the present exemplary embodiment, the conveying helix 3 is designed as a two-start conveying helix, in each case a main disposal flute 10, 11 being formed over a height section $h_1$ between two helically encircling main webs 6, 7.

These height sections $h_1$ are only shown symbolically in FIG. 1a in order to show the region of such a main disposal flute 10, 11. The main webs 6, 7 of the conveying helix 3 have an outside diameter $d_1$ and also have, for example, a rectangular or semi-trapezoidal cross section with conveying edges 13, 14 lying perpendicularly to the drill longitudinal axis 12.

Located within each main disposal flute 10, 11 having the main webs 6, 7 defining them is in each case a likewise helically encircling secondary web 8, 9 having a smaller outside diameter $d_2$. The secondary web 8, 9 is formed as a projection inside the main disposal flute 10, 11. The main web 6 therefore forms the lateral, approximately radially running conveying edge 13 for the drillings to be conveyed, and the main web 7 forms the corresponding conveying edge 14 for corresponding drillings. Equally, the secondary web 8 likewise has a conveying edge 15 for drillings which is approximately perpendicular to the drill longitudinal axis, and the further secondary web 9 has a corresponding conveying edge 16 for corresponding drillings. It follows from this that the main disposal flute 10 is divided into two disposal flutes 17, 18 having the conveying edges 13, 15, and the further main disposal flute 11 is divided into two further disposal flutes 19, 20 having the conveying edges 14, 16. The conveying helix is therefore a two-start conveying helix 3 having the main webs 6, 7 with in each case secondary conveying webs 8, 9 embedded in the drillings disposal flute 10, 11. In addition to the conveying edges 13 to 16, which to a very large extent run radially, the conveying helix 3 has axially parallel sections in the flute root, which are indicated by reference numeral 21.

The width of the main webs 6, 7 is $s_1$. The secondary webs 8, 9 are designed in such a way that they taper virtually to a point at their outer periphery. The diameter ratio $d_1$ to $d_2$ is approximately $d_2 \cong 0.7$ to $0.9 \times d_1$.

Figure 2A:
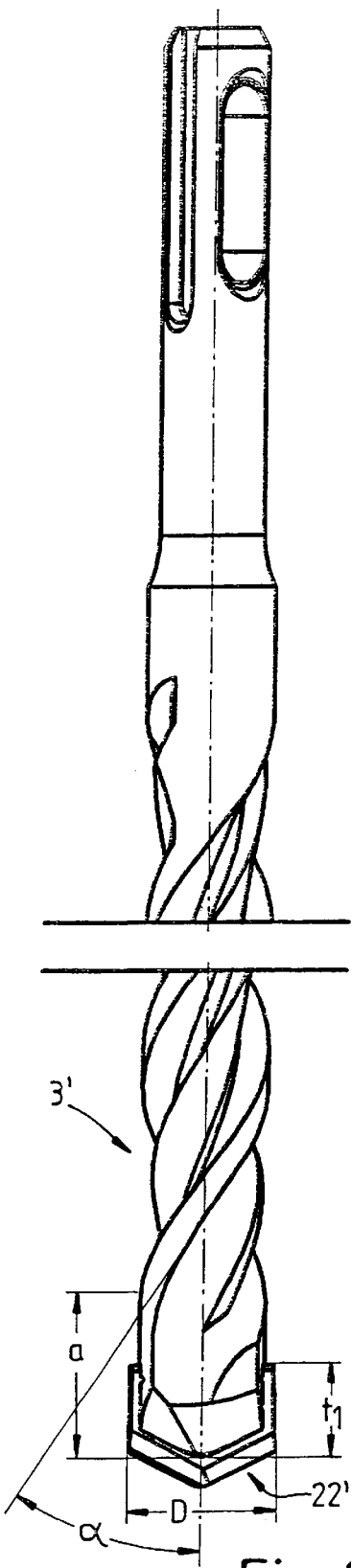
FIGS. 2a to 2c show a view of the drilling tool according to the prior art.
Figure 2C:
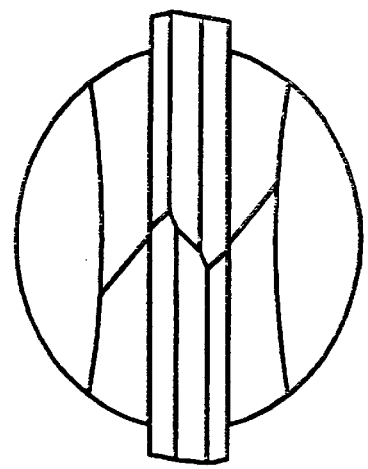
Figure 2B:
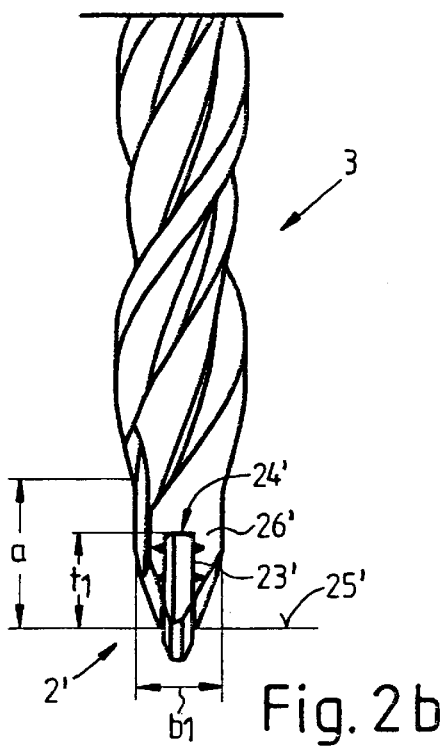

Apart from that, reference is again made to DE 197 53 731 A1 for explaining the construction of the helical shank 3. Such a helix is produced by a machining process, that is to say, for example, with a profiled grinding wheel or a corresponding milling tool. The conveying helix 3' shown in FIGS. 2a to 2c is in principle of the same construction as described above. This pertains according to DE 197 53 731 A1 to the prior art. In order to be able to use a carbide cutting tip 22' in this prior art, the drill head 2' is provided with a locating slot 23' which has an axial penetration depth $t_1$. The slot root is provided with reference numeral 24'.

In the prior art, the conveying helix 3' ends approximately at a distance a below the drill front edge 25'. In this case, the drill front edge 25' is the front part of the drill without inserted carbide cutting tip 22'. If the conveying helix were to be run out up to the drill front edge, the flute would extend up to this front region, so that there would only be narrow conveying helix webs. A carbide cutting tip cannot be inserted into such narrow conveying helix webs in such a way that it is held so as to be supported in the drill head on both sides. Consequently, the conveying helix flute ends at a distance a before the drill front edge, so that the widened land 26' shown in FIG. 2b is obtained (width $b_1$), which serves to support the carbide cutting tip on both sides. The distance a at which the conveying helix ends is selected to be approximately the same size as the nominal diameter D, that is to say the width of the carbide cutting tip 22'. This is done by backing out the grinding wheel rectilinearly without the tool continuing to rotate in this region. The helix angle α thus becomes zero degrees.

As can be seen from FIG. 2b, a sufficient supporting cross section for the carbide cutting tip appears due to this measure. Nonetheless, the drilling tool in this region is of extremely slim design, which, when starting to drill, at least makes the guidance properties worse until the actual conveying helix engages.

Figure 1C:
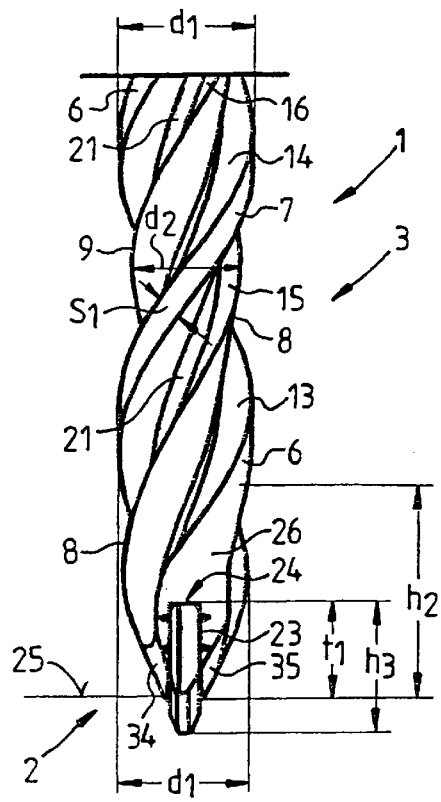

This is improved according to the present invention according to the representations of FIGS. 1a to 1c by the conveying helix 3 and in particular the disposal flutes 17 to 20 being run right into the front region of the drill head 2. The section a from FIGS. 2a, 2b is thus dispensed with, so that the conveying edge 14, shown in FIG. 1a for example, is run virtually up to the drill front edge 25. In any case, the disposal flutes 17 to 20 extend right into the region which is required by the depth $t_1$ for producing the locating slot 23 with slot root 24. So that gradual widening of the main webs 6, 7 is nonetheless obtained, the flute depth is gradually reduced starting from a height distance $h_2$ in front of the drill front edge 25, so that the main webs 6, 7 widen gradually, as is shown as a widening land by reference numeral 26. The core cross section increases with the decrease in the flute depth, so that a correspondingly wide land 26, 27 can appear, in which at least one corresponding locating slot 23 for locating a carbide insert 22 and preferably a carbide cutting tip 22 can be made. In this case, the height section $h_2$ corresponds approximately to the pitch $h_1$ of the main disposal flutes 10, 11.

The widening of the lands 26, 27 which is caused by this is also shown in FIG. 1c. A carbide cutting tip 22 of conventional type of construction can be inserted into such a drill head without problems. The carbide cutting tip 22 has a diameter D (nominal diameter). The height of the cutting tip is specified as $h_3$.

Arrow 28 shows the direction of rotation of the drilling tool. The roof-shaped carbide cutting tip 22 has two lips 29, 30, having rake faces 31 pointing in the direction of rotation, front-end cutting edges 32 lying on a lateral surface of a cone, and a rear flank 33, which in the exemplary embodiment is divided into two flank sections 33', 33".

As can be seen from FIGS. 1a to 1c, an increase in the land widths is achieved by the gradual increase in the core thickness at the runout of the conveying helix in the drill head region, so that the locating slot 23 for the carbide cutting tip can be made in the drill head without any problems, although the conveying helix extends right into the front surface sections 34, 35, as produced, for example, by the point grinding of the drill head. In any case, the conveying helix is run right into the region of the drill head, which is defined by the depth $t_1$ for producing the locating slot 23. That is to say that the conveying helix 3 is continued into the drill head 2 to the extent that it extends to above the slot root 24. This extension may be continued, for example, up to half the depth $t_1$ of the locating slot 23.

The invention is not restricted to the exemplary embodiment shown and described. On the contrary, it comprises all variants and developments within the scope of the patent claims. For example, instead of a carbide cutting tip, a multi-edge carbide insert, e.g. a carbide cross or the like, may also be inserted into the drill head.

List of Designations
1 Rock drill
2 Drill head
3 Conveying helix
4 Clamping shank
5 Locating means
6 Main web
7 Main web
8 Secondary web
9 Secondary web
10 Main disposal flute
11 Main disposal flute
12 Drill longitudinal axis
13 Conveying edge
14 Conveying edge
15 Conveying edge
16 Conveying edge
17 Disposal flute
18 Disposal flute
19 Disposal flute
20 Disposal flute
21 Axially parallel section
22 Carbide cutting tip
23 Locating slot
24 Slot root
25 Drill front edge
26 Land
27 Land
28 Arrow/direction of rotation
29 Lip
30 Lip
31 Rake face
32 Cutting edge
33 Flank
34 Surface section
35 Surface section

What is claimed is:

1. A rock drill for hand-guided rotary hammers, percussion drilling machines or rotary drilling machines, comprising:

a drill head having at least one locating slot, a carbide insert, and a supporting region of the carbide insert;

a single- or multi-start conveying helix having a flute and adjoining the drill head; and a clamping shank adjoining the conveying helix, wherein the carbide insert extends at least in a direction transversely across the drill head and is embedded in the at least one locating slot, the drill head has a support for the carbide insert in a region of the embedding of the carbide insert, the conveying helix extends into the supporting region of the carbide insert, and a core thickness of the conveying helix flute increases toward the drill head, and wherein the conveying helix is continued into a region of surface sections of the drill head, the surface sections being provided in the region of the embedding of the carbide insert; and further comprising a disposal flute, wherein a decrease in depth of the disposal flute is effected continuously before and in the region of surface sections of the drill head, a core thickness of the conveying helix increasing continuously toward the drill head.

2. The rock drill as claimed in claim 1, wherein lands of the conveying helix widen in a region of the at least one locating slot.

3. The rock drill as claimed in claim 1, wherein the increase in the core thickness of the conveying helix in a drill head region is such that the carbide insert is embedded on both sides, virtually over a full side surface area of the carbide insert.

4. The rock drill as claimed in claim 1, wherein the conveying helix, without a straight runout, starts directly in the region of the embedding of the carbide insert at the drill head with a uniform helix angle.

5. The rock drill as claimed in claim 1, wherein the single- or multi-start conveying helix adjoins the drill head, the conveying helix having helically encircling main webs with an outside diameter and likewise helically encircling secondary webs with a smaller outside diameter, the main and secondary webs having conveying edges in disposal flutes for transporting drillings.

6. The rock drill as claimed in claim 1, wherein the conveying helix is of two-start design, having two helically encircling main webs and two secondary webs lying in between.

7. The rock drill as claimed in claim 6, wherein the secondary webs have lands tapering to a point.

8. The rock drill as claimed in claim 6, wherein each of the secondary webs is a prominence relative to a root of the flute, the prominence being one of rectangular, trapezoidal, semitrapezoidal, triangular, crowned and hemispherical in cross section, the secondary webs having lands, the land of each secondary web tapering to one of a point, a flat end and a round end.

9. The rock drill as claimed in claim 5, wherein, to form bearing surfaces for drillings, conveying edges of the main webs and/or of the secondary webs run approximately at right angles to a longitudinal axis of the drill.

10. The rock drill as claimed in claim 1, wherein the carbide insert is a roof-shaped carbide cutting tip.

11. The rock drill as claimed in claim 1, wherein a pitch relative to a helix angle of the conveying helix remains constant.

* * * * *